(12) United States Patent
Kim et al.

(10) Patent No.: US 9,140,894 B2
(45) Date of Patent: Sep. 22, 2015

(54) ELECTRO-WETTING DISPLAY APPARATUS

(71) Applicant: Amazon Technologies, Inc., Seattle, WA (US)

(72) Inventors: Myung-Eun Kim, Hwaseong-si (KR); Sang-Il Kim, Yongin-si (KR); Yeuntae Kim, Suwon-si (KR); Yujin Kim, Yongin-si (KR); Byungseok Choi, Seoul (KR)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/609,198

(22) Filed: Jan. 29, 2015

(65) Prior Publication Data

US 2015/0146274 A1 May 28, 2015

Related U.S. Application Data

(63) Continuation of application No. 13/547,384, filed on Jul. 12, 2012, now Pat. No. 8,964,276.

(30) Foreign Application Priority Data

Feb. 13, 2012 (KR) .................. 10-2012-0014429

(51) Int. Cl.
    *G02B 26/02* (2006.01)
    *G02B 26/00* (2006.01)

(52) U.S. Cl.
    CPC .............. *G02B 26/005* (2013.01); *G02B 26/02* (2013.01)

(58) Field of Classification Search
    CPC ..... G02B 26/00; G02B 26/004; G02B 26/005
    USPC ............................ 359/228, 290, 291
    See application file for complete search history.

(56) References Cited

U.S. PATENT DOCUMENTS

| | | | | |
|---|---|---|---|---|
| 2010/0090930 | A1* | 4/2010 | Marcu et al. | 345/72 |
| 2012/0098812 | A1 | 4/2012 | Bae et al. | |

FOREIGN PATENT DOCUMENTS

| | | |
|---|---|---|
| JP | 2006098679 A | 4/2006 |
| JP | 2010211037 A | 9/2010 |
| KR | 1020070081736 | 6/2007 |
| KR | 1020080071250 A | 8/2008 |

OTHER PUBLICATIONS

Office action for U.S. Appl. No. 13/547,384, mailed on Jul. 7, 2014, Kim et al., "Electro-Wetting Display Apparatus", 6 pages.

* cited by examiner

*Primary Examiner* — Euncha Cherry
(74) *Attorney, Agent, or Firm* — Lee & Hayes, PLLC (57) ABSTRACT

An electro-wetting display apparatus includes a first base substrate, a plurality of first electrodes on the first base substrate, an insulating layer which overlaps the first electrodes, a pixel wall on the insulating layer, where the pixel wall partitions a plurality of pixels respectively corresponding to the plurality of first electrodes, a second base substrate which face the first base substrate, a second electrode on the second base substrate and including a plurality of openings, and a fluid between the first base substrate and the second base substrate and in the plurality of pixels. The movement of the fluid in the plurality of pixels is controlled by voltages respectively applied to the first electrodes and the second electrode.

24 Claims, 12 Drawing Sheets

ELECTRO-WETTING DISPLAY APPARATUS

CROSS REFERENCE TO RELATED APPLICATIONS

This application is a continuation of and claims priority to U.S. patent application Ser. No. 13/547,384, filed Jul. 12, 2012, which claims priority to Korean Patent Application No. 10-2012-0014429, filed Feb. 13, 2012, and all the benefits accruing under 35 U.S.C. §119, which are incorporated herein by reference.

BACKGROUND

1. Field

The disclosure relates to an electro-wetting display apparatus. More particularly, the disclosure relates to an electro-wetting display apparatus capable of improving reflectance and transmittance thereof.

2. Description of the Related Art

An electro-wetting display apparatus, which has properties of low power consumption, high visibility, etc. when compared with a liquid crystal display, has been spotlighted. The electro-wetting display apparatus utilizes a principle in which two fluids, such as water and oil, are not mixed with each other.

The electro-wetting display apparatus is classified into a transmissive-type and a reflective-type. The transmissive-type electro-wetting display apparatus includes an upper substrate including an upper transparent electrode formed thereon, a lower substrate facing the upper substrate and including a plurality of lower transparent electrodes formed thereon, and a fluid disposed between the upper substrate and the lower substrate. The fluid includes a polar fluid and a non-polar fluid.

The reflective-type electro-wetting display apparatus further includes a reflective layer to reflect light. Movements of the polar fluid and the non-polar fluid are controlled according to a power source voltage applied to the upper transparent electrode and the lower transparent electrode, thereby displaying gray scales.

When the electro-wetting display apparatus is operated in a transmissive mode, the light passing through the upper substrate transmits through the lower substrate. In the reflective-type electro-wetting display apparatus, the light passing through the upper substrate is reflected by the reflective layer and the reflected light transmits again through the upper substrate. Accordingly, the light passes through the upper transparent electrode of the upper substrate one time in the transmissive-type electro-wetting display apparatus and passes through the upper transparent electrode of the upper substrate two times in the reflective-type electro-wetting display apparatus.

Recently, a technology is required to improve reflectance and transmittance of the electro-wetting display apparatus.

SUMMARY

The disclosure provides an electro-wetting display apparatus improving a transmittance and reflectance thereof.

Embodiments provide an electro-wetting display apparatus including a first base substrate, a plurality of first electrodes on the first base substrate, an insulating layer which overlaps the plurality of first electrodes, a pixel wall on the insulating layer, where the pixel wall partitions a plurality of pixels respectively corresponding to the plurality of first electrodes, a second base substrate which faces the first base substrate, a second electrode on the second base substrate and including a plurality of openings, and a fluid between the first base substrate and the second base substrate and respectively in the plurality of pixels. The movement of the fluid in the plurality of pixels is controlled by voltages respectively applied to the first electrodes and second electrode.

The plurality of openings may respectively correspond to the plurality of pixels.

Each of the plurality of openings may have a rectangular shape, and a width of the pixel wall between two adjacent pixels may be smaller than a width between two adjacent openings.

Each of the plurality of openings may have a rectangular shape, and a width of the pixel wall between two adjacent pixels may be larger than a width between two adjacent openings.

Each of the plurality of openings may have a rectangular shape, and a width of the pixel wall between two adjacent pixels may be equal to a width between two adjacent openings.

The plurality of pixels may be arranged in "n" rows by "m" columns and the plurality of openings may respectively correspond to a plurality of pixel units. Each of the plurality of pixel units includes two or more pixels, but equal to or less than "m" pixels, in each row.

The plurality of pixels may be arranged in "n" rows by "m" columns and the plurality of openings may respectively correspond to a plurality of pixel units. Each of the plurality of pixel units includes two pixels in column, and two or more pixels but less than "m" pixels in each row.

According to the above, one or more embodiments of the electro-wetting display apparatus includes an upper transparent electrode including openings, so the electro-wetting display apparatus may improve the transmittance and reflectance thereof.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1:
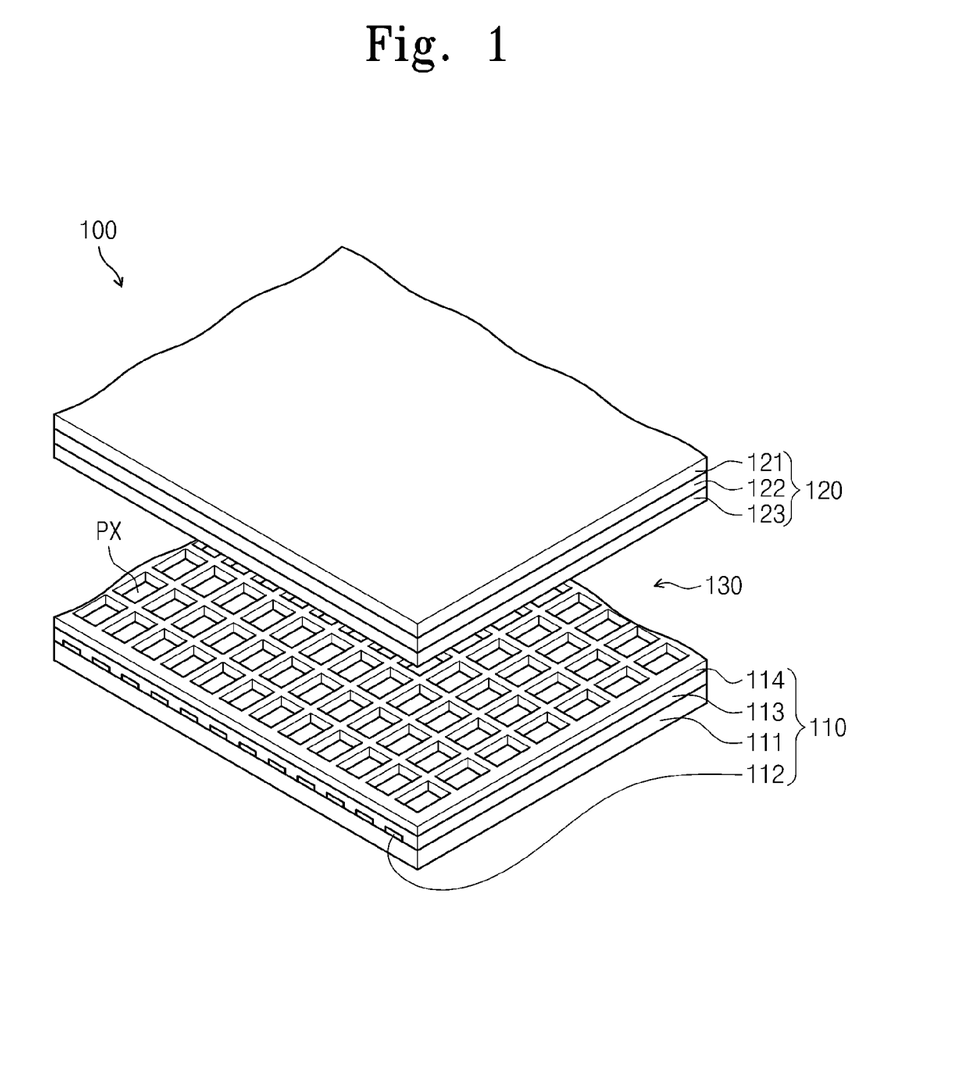
FIG. 1 is an exploded perspective view showing an exemplary embodiment of an electro-wetting display apparatus according to the invention.
Figure 2:
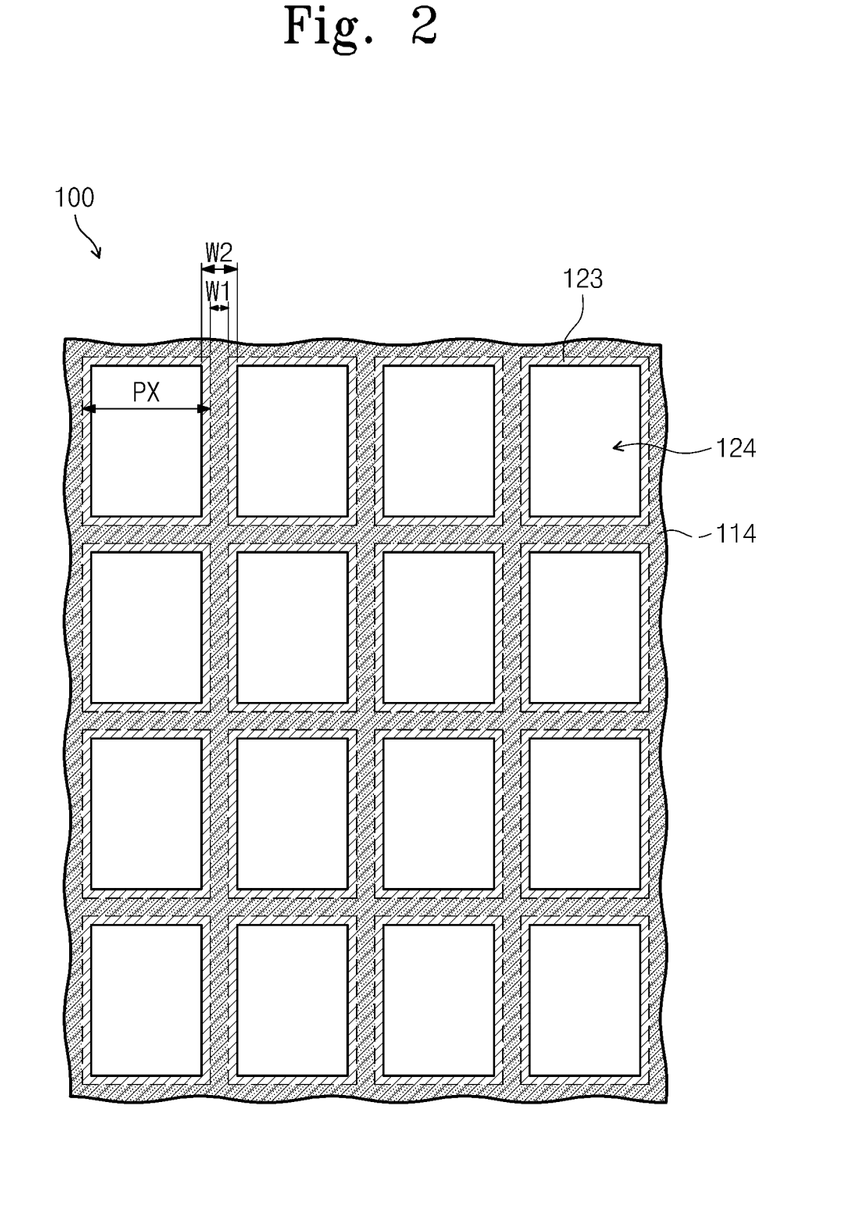
FIG. 2 is a plan view showing an exemplary embodiment of a plan structure of an electro-wetting display apparatus according to the invention.

FIG. 1 is an exploded perspective view showing an exemplary embodiment of an electro-wetting display apparatus according to the invention and FIG. 2 is a plan view showing an exemplary embodiment of a plan structure of an electro-wetting display apparatus according to the invention. For the convenience of explanation, a pixel wall has been shown as a dotted line and a darker gray color, and a second electrode has been shown as a solid line and an area shaded with an oblique line in FIG. 2.

Referring to FIGS. 1 and 2, the electro-wetting display apparatus 100 includes a first substrate 110, a second substrate 120 facing the first substrate 110, and a fluid 130 disposed between the first substrate 110 and the second substrate 120.

The first substrate 110 includes a first base substrate 111, a plurality of first electrodes 112 disposed on the first base substrate 111, an insulating layer 113 disposed on the first base substrate 111 to cover the first electrodes 112, and a pixel wall 114 disposed on the insulating layer 113 to define areas for pixels PX. The first electrodes 112 respectively correspond to the pixels PX.

The second substrate 120 includes a second base substrate 121 facing the first base substrate 111, color filters 122 disposed on the second base substrate 121, and a second electrode 123 disposed on the color filters 122. The second electrode 123 includes a plurality of openings 124 extended through a thickness of the second electrode 123. The color filters 122 may include color pixels to display one of red, green and blue colors.

The openings 124 of the second electrode 123 respectively correspond to the pixels PX defined on the first substrate 110. The openings 124 are areas excluding material of the second electrode 123 and are enclosed openings solely defined by the second electrode 123.

The pixels PX are arranged in "n" rows by "m" columns, where "n" and "m" are constant numbers larger than zero (0). The pixels PX may include a red pixel R, a green pixel G, and a blue pixel B respectively corresponding to the color filters 122. In addition, in the pixels PX, the red, green and blue pixels are alternately and repeatedly arranged in the row and column directions. However, the arrangement of the pixels PX should not be limited thereto or thereby.

Each of the first and second base substrates 111 and 121 may be a glass substrate or a plastic substrate. When the first and second base substrates 111 and 121 are the plastic substrate, a flexible display may be embodied.

The first electrodes 112 may include a transparent conductive material, such as indium tin oxide, conductive polymer, carbon nanotube, etc. The second electrode 123 may include a transparent conductive material, such as indium tin oxide.

The openings 124 have a rectangular planar shape, but the shape should not be limited to the rectangular shape. Alternatively, for instance, each opening 124 of the second electrode 123 may have a planar shape bent at a right angle.

The second electrode 123 is partially overlapped with the pixel wall 114. In one exemplary embodiment, for example, as shown in FIG. 2, a width W1 of the pixel walls 114 between two pixels PX adjacent to each other is smaller than a width W2 between the edges of two openings 124 adjacent to each other. The width W2 is effectively a width of the second electrode 123 between the two openings 124 adjacent to each other.

However, the overlap area between the second electrode 123 and the pixel wall 114 should not be limited thereto or thereby. That is, the width W1 of the pixel walls 114 between two pixels PX adjacent to each other may be larger than the width W2 between two openings 124 adjacent to each other. This will be described in detail with reference to FIG. 6.

In addition, although not shown in figures, the width W1 of the pixel walls 114 between two pixels PX adjacent to each other may be the same as the width W2 between two openings 124 adjacent to each other.

Since the second electrode 123 includes the openings 124, the second electrode 123 has a total planar area smaller than that when the second electrode 123 is a single, unitary, indivisible body without the openings 124. In one exemplary embodiment, for example, when the width W1 of the pixel wall 114 is smaller than the width W2 of the second electrode 123 as shown in FIG. 2, the area of the second electrode 123 including the openings 124 is reduced by about 87.89% when compared with the area of the second electrode 123 as the single body without the openings 124.

In addition, although not shown in figures, in the case that the width W1 of the pixel wall 114 is equal to the width W2 of the second electrode 123, the area of the second electrode 123 including the openings 124 is reduced by more than 87.89% when compared with the area of the second electrode 123 as the single body without the openings 124.

The fluid 130 includes a first fluid having properties of hydrophilicity as a polar fluid and a second fluid having properties of hydrophobicity as a non-polar fluid. The first fluid transmits the light incident thereto. The second fluid includes a light-blocking material such as a black dye or a material that absorbs the light. The first fluid is disposed on the second fluid.

A surface of the insulating layer 113 is surface-treated to have the hydrophobicity property or additional hydrophobic layer (not shown) is on the insulating layer 113. The pixel wall 114 disposed on the insulating layer 113 may include a photoresist material or be on the insulating layer 113 by patterning an insulating layer, e.g., silicon nitride (SiNx), silicon oxide (SiOx), etc.

Before a power source voltage is applied to the first electrodes 112 and the second electrode 123, the pixels PX display a black gray scale since the second fluid covers the insulating layer 113. When the power source voltage is applied to the first electrodes 112 and the second electrode 123, the first fluid is polarized to push the second fluid to a side of the pixels PX, so that the first fluid makes contact with the insulation layer. In this case, the incident light passes through the first fluid disposed in the area not overlapped by the second fluid. The light passing through the first fluid passes through the color filters and is perceived to a viewer. According to an amount of the second fluid pushed out by the first fluid, a contrast ratio may be controlled.

Exemplary embodiments of the arrangement and operation of the first and second fluids will be described in detail with reference to FIGS. 3A and 3B.

Although not shown in FIG. 1, the electro-wetting display apparatus 100 may further include a backlight unit disposed under the first substrate 110 to provide the light to the pixels PX. The backlight unit includes a plurality of light sources, e.g. a light emitting diode, a cold cathode fluorescent lamp, etc.

When the second electrode 123 is the single body without the openings 124, a portion of the light may not transmit through the second electrode 123 since the transmittance of the second electrode 123 is not 100%. However, when the second electrode 123 includes the openings 124 corresponding to the areas excluding material of the second electrode 123, the light may transmit through the openings 124. Thus, the electro-wetting display apparatus 100 may improve the transmittance of the light.

Figure 3A:
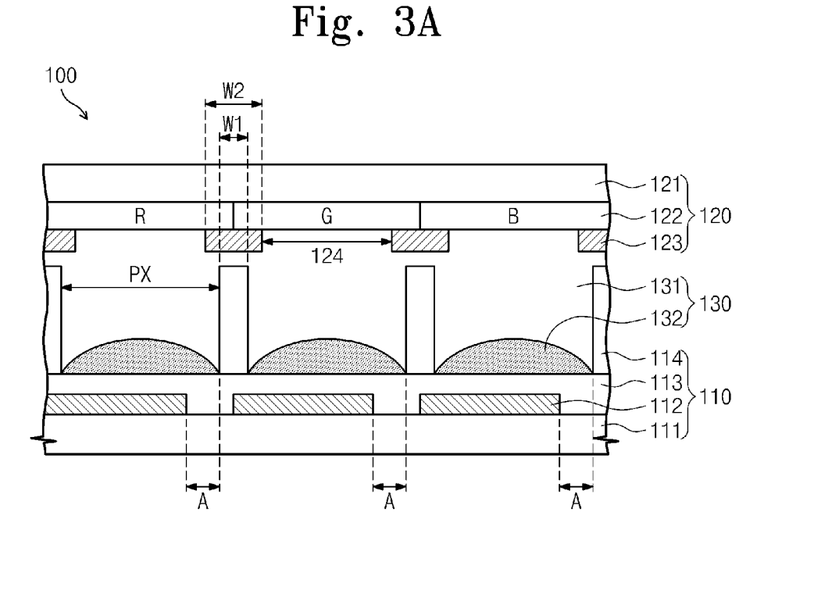
FIGS. 3A and 3B are cross-sectional view showing an exemplary embodiment of a cross-sectional structure of an electro-wetting display apparatus according to the invention.
Figure 3B:
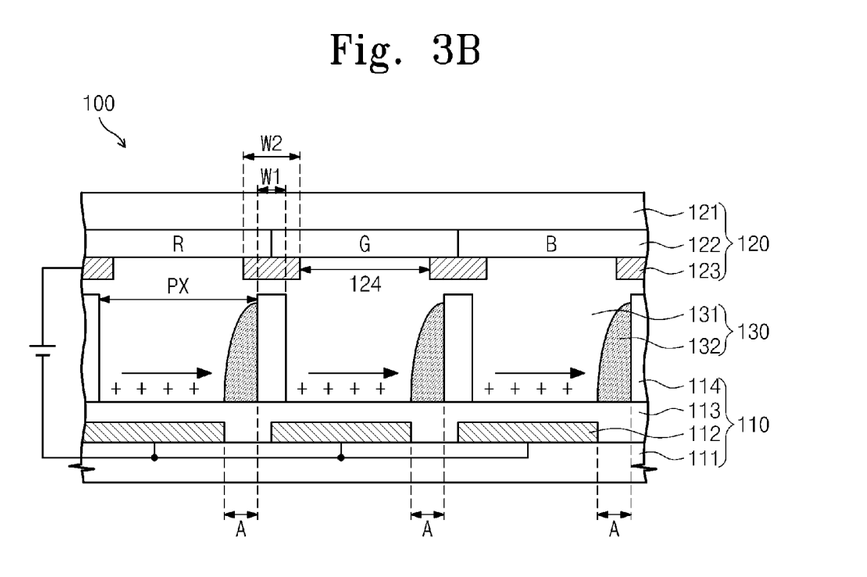

FIGS. 3A and 3B are cross-sectional views showing exemplary embodiments of a cross-sectional structure of an electro-wetting display apparatus according to the invention. In detail, FIG. 3A shows the arrangement of the fluids when no power source voltage is applied to the electrodes, and FIG. 3B shows the arrangement of the fluids when the power source voltage is applied to the electrodes.

Referring to FIG. 3A, the fluid 130 includes the first fluid 131 and the second fluid 132. The first fluid 131 is the polar fluid and has the hydrophilicity property. In one exemplary embodiment, for instance, the first fluid 131 may include water or an electrolyte solution to transmit the light incident thereto.

The second fluid 132 is disposed directly on the insulating layer 113, and between the first fluid 131 and the insulating layer 113. The first fluid 131 and the second fluid 132 have different specific gravities from each other, so the first fluid 131 and the second fluid 132 are not mixed with each other. The first fluid 131 is disposed on the second fluid 132 to make contact with the second fluid 132 and forms a boundary therebetween.

The electro-wetting display apparatus 100 controls movements of the first fluid 131 and the second fluid 132 using the voltages applied to the first electrodes 112 and the second electrode 123 to display a desired gray scale.

In one exemplary embodiment, as an example, the second fluid 132 includes a dye that represents one of the red, green and blue colors or a material that represents the red, green and blue colors. In this case, the electro-wetting display apparatus 100 does not need to include the color filters 122.

Each of the pixels PX includes an area "A" corresponding to an area between the pixel wall 114 and the first electrode 112. The areas "A" exclude the first electrodes 112. As described above, the surface of the insulating layer 113 adjacent to the fluid 130 has the hydrophobicity property.

In the case that the power source voltage is not applied to the first electrodes 112 and the second electrode 123, an entire of the insulating layer 113 is covered and overlapped by the second fluid 132. Accordingly, the electro-wetting display apparatus 100 displays the black gray scale since light is blocked by the second fluid 132.

Referring to FIG. 3B, when the power source voltage is applied to the first electrodes 112 and the second electrode 123, the first fluid 131 makes contact with the insulating layer 113. In detail, when a negative (−) voltage is applied to the first electrodes 112 and a positive (+) voltage is applied to the second electrode 123, the first fluid 131 disposed on the second fluid 132 is polarized. Thus, the first fluid 131 makes contact with the insulating layer 113 and pushes the second fluid 132 to the area "A".

In this case, the light incident to the pixel PX passes through the first fluid 131 except the area "A" in which the second fluid 132 is gathered. The light passing through the first fluid 131 passes through the color filters 122 of the second substrate 120 to be perceived to the viewer. According to the amount of the second fluid 132 displaced by the first fluid 131, the contrast ratio may be controlled. The amount of the second fluid 132 displaced by the first fluid 131 may be adjusted by the level of the voltages applied to the first electrodes 112 and the second electrode 123.

The pixel wall 114 disposed on the insulating layer 113 has a height taken from the first base substrate 111 greater than that of the second fluid 132 gathered at the area "A" disposed at the side of each pixel PX. In FIGS. 3A and 3B, the pixel wall 114 does not make contact with the second electrode 123, but the pixel wall 114 may contact with the second electrode 123 according to alternative exemplary embodiments.

Consequently, although the voltage is applied to a portion of the pixel PX through the second electrode 123, the first fluid 131 makes contact with the insulating layer 113 and the second fluid 132 is pushed to the area "A" by the first fluid 131.

Figure 4:
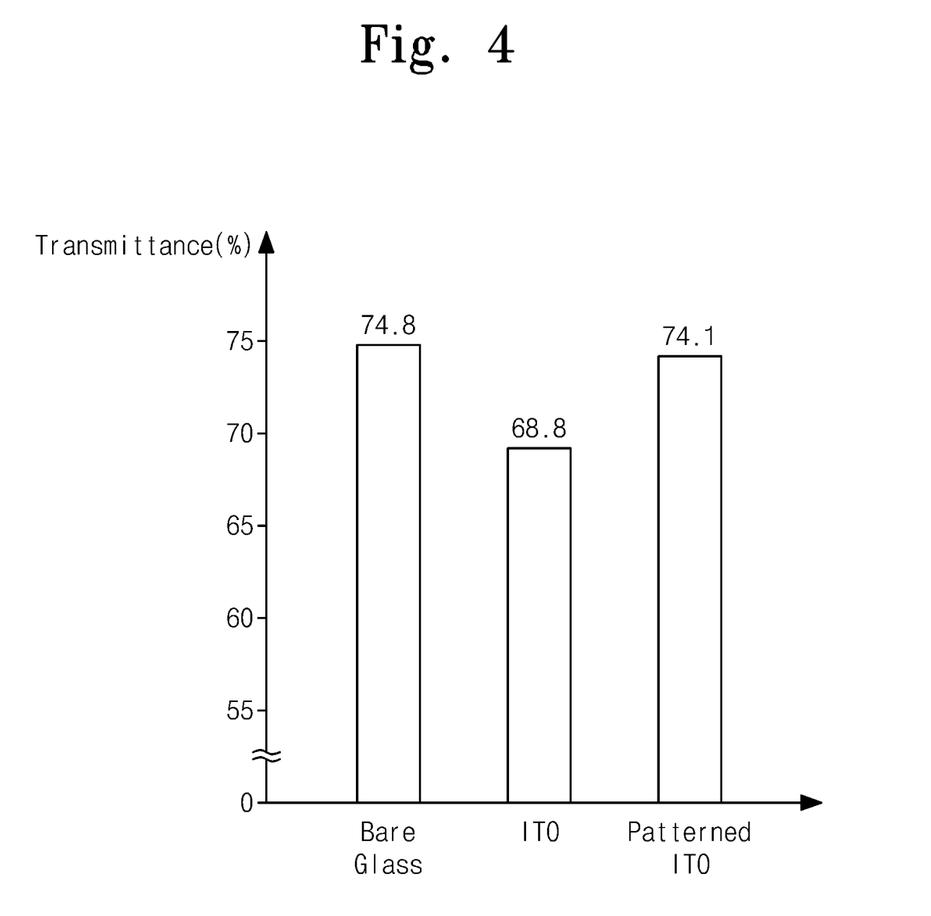
FIG. 4 is a graph showing experimental results of a variety of electro-wetting display apparatus structures according to the invention.

FIG. 4 is a graph showing experimental results of transmittance of a variety of electro-wetting display apparatus structures. FIG. 4 shows transmittances in percent (%) measured when the second electrode is substantially excluded, when the second electrode is the single body without the openings, and the second electrode 123 is patterned to include the openings 124. The second electrode patterned to include the openings has the area that is reduced by about 87.89% when compared with the area of the second electrode as the single body without the openings.

Referring to FIG. 4, the light transmittance is about 74.8 percent (e.g., bare glass) when the electro-wetting display apparatus does not include the second electrode. When the electro-wetting display apparatus includes the second electrode as the single body without the openings (e.g., ITO), the light transmittance is about 68.8 percent. When an exemplary embodiment of the electro-wetting display apparatus 100 includes the second electrode 123 that is patterned to include the openings 124 as shown in FIG. 2, the light transmittance is about 74.1 percent.

According to the experimental results, the light transmittance may be greater when the second electrode 123 includes the openings 124 respectively corresponding to the pixels PX than the light transmittance when the second electrode 123 is the single body without the openings.

Figure 5:
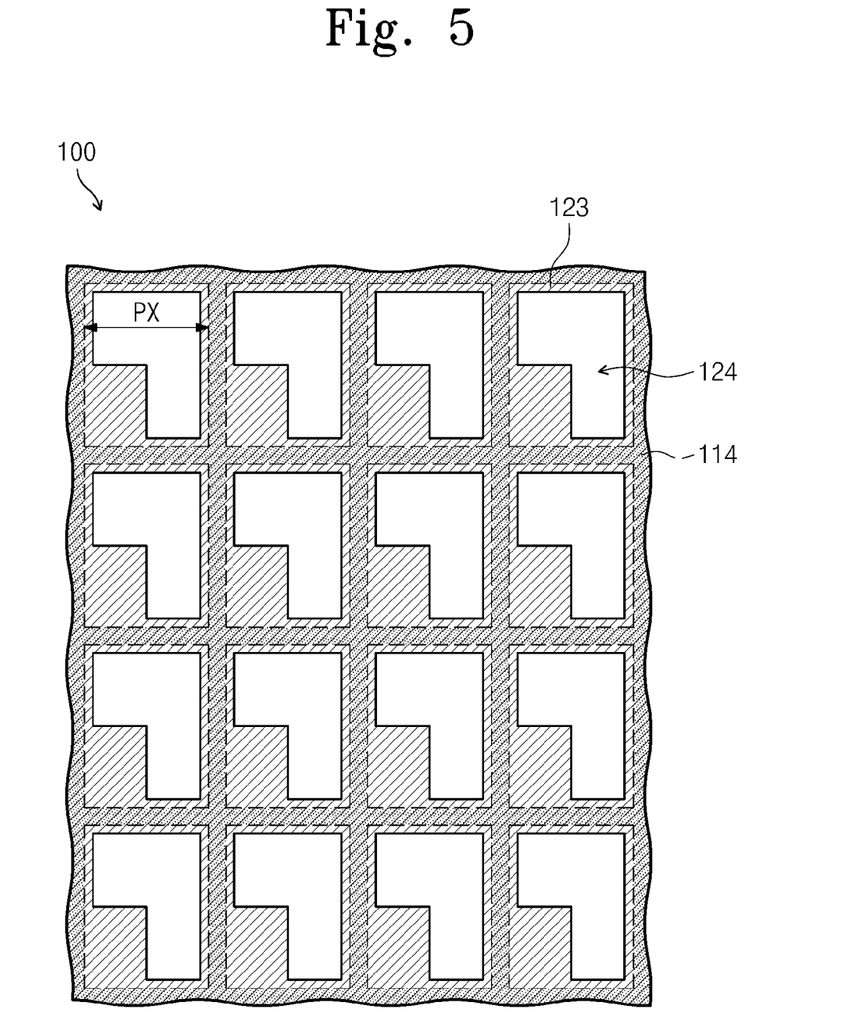
FIG. 5 is a plan view showing another exemplary embodiment of a second electrode of an electro-wetting display apparatus according to the invention.

FIG. 5 is a plan view showing another exemplary embodiment of a second electrode of an electro-wetting display apparatus according to the invention. The second electrode shown in FIG. 5 has the substantially same structure as the second electrode shown in FIG. 2 except for the shape of the openings. For the convenience of explanation, the pixel wall has been shown as a dotted line and a darker gray color and the second electrode has been shown as a solid line and an area shaded with an oblique line in FIG. 5.

Referring to FIG. 5, the second electrode 123 includes a plurality of openings 124 respectively corresponding to the pixels PX. Each of the openings 124 of the second electrode 123 has a planar shape bent at a right angle, such as an "L" shape. That is, the second electrode 123 in the pixels PX includes an expanded portion which extends to a center portion of the openings 124 from a side of the openings 124, and the expanded area of the second electrode 123 may have a quadrilateral or right-angle planar shape.

Consequently, since the exemplary embodiment of the second electrode 123 includes the openings 124, the electro-wetting display apparatus 100 may improve the light transmittance different from that measured when the second electrode is the single body without the openings.

Figure 6:
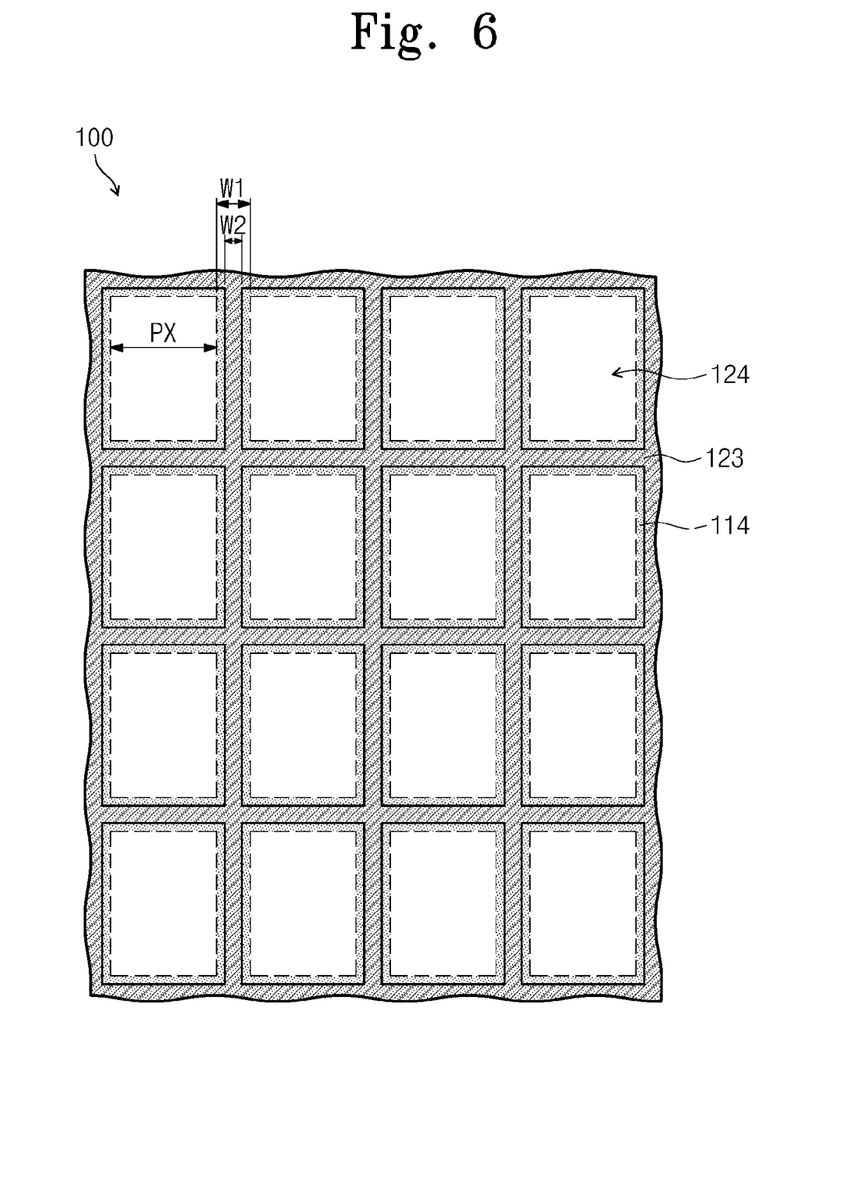
FIG. 6 is a plan view showing another exemplary embodiment of a second electrode of an electro-wetting display apparatus according to the invention.

FIG. 6 is a plan view showing another exemplary embodiment of a second electrode of an electro-wetting display apparatus according to the invention. For the convenience of explanation, the pixel wall has been shown as a dotted line and a darker gray color, and the second electrode has been shown as a solid line and an area shaded with an oblique line in FIG. 6.

Referring to FIG. 6, the second electrode 123 includes a plurality of openings 124 respectively corresponding to the pixels PX. A width W1 of the pixel wall 114 disposed between two pixels PX adjacent to each other is larger than a width W2 between two openings 124 adjacent to each other.

As described with reference to FIG. 2, the area of the second electrode 123 including the openings 124 is reduced by about 87.89% when compared with the area of the second electrode 123 as the single body without the openings 124. However, the width W1 of the pixel wall 114 is larger than the width W2 of the second electrode 123 as shown in FIG. 6. Thus, the area of the second electrode 123 including the openings 124 may be reduced by more than 87.89% when compared with the area of the second electrode as the single body without the openings 124.

Consequently, since the exemplary embodiment of the second electrode 123 includes the openings 124, the electro-wetting display apparatus 100 may improve the light transmittance different from that measured when the second electrode is the single body without the openings.

Figure 7A:
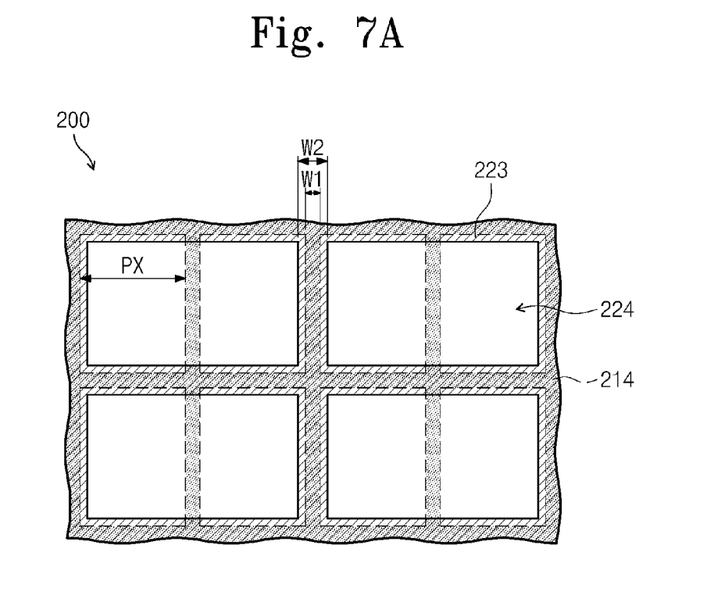
FIGS. 7A to 7C are plan views showing other exemplary embodiments of plan structures of an electro-wetting display apparatus according to the invention.
Figure 7B:
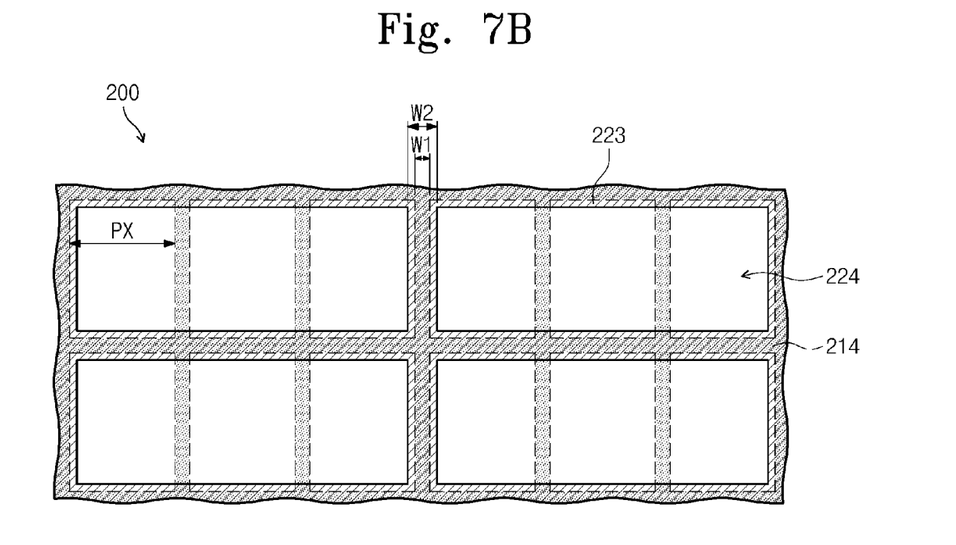
Figure 7C:
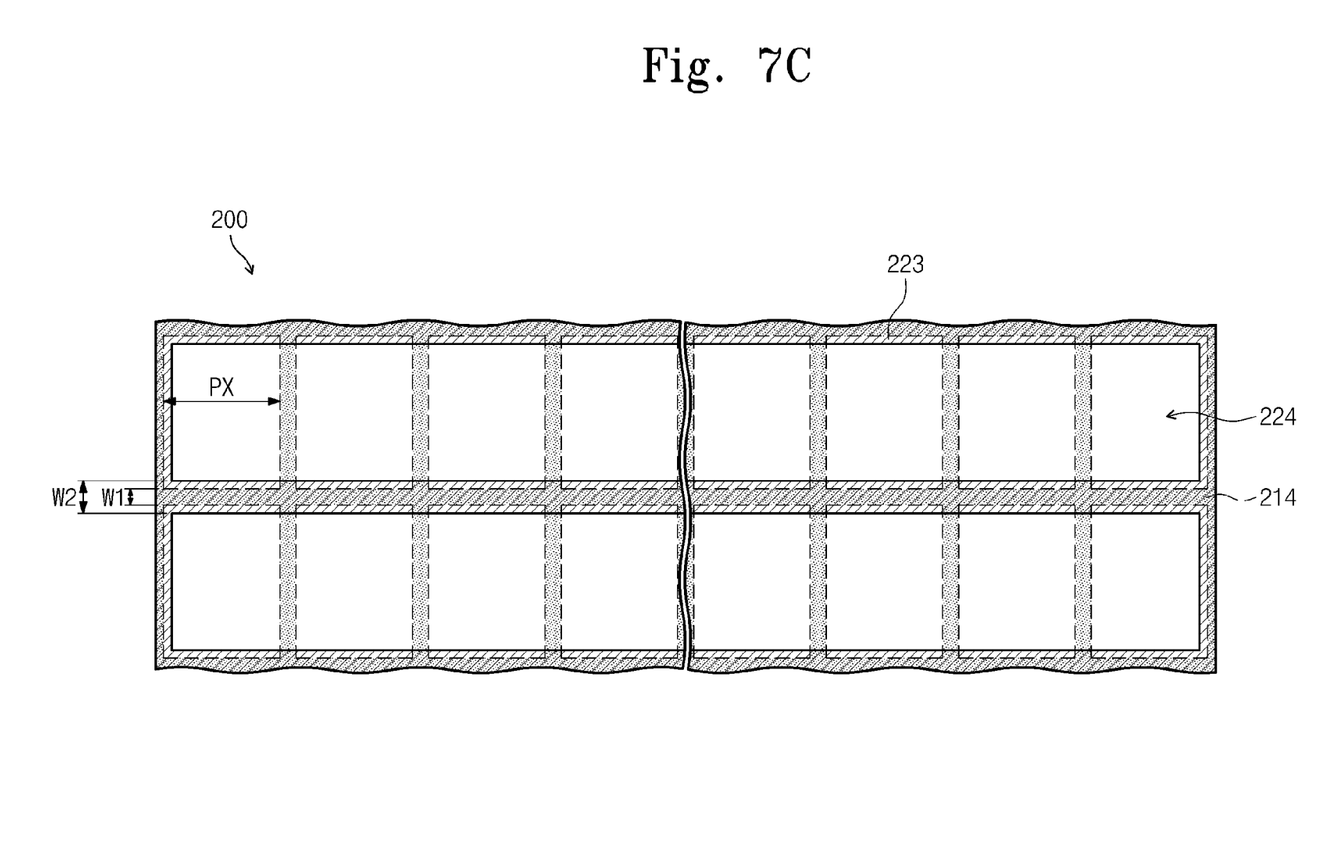

FIGS. 7A to 7C are plan views showing other exemplary embodiments of plan structures of an electro-wetting display apparatus according to the invention. For the convenience of explanation, a pixel wall has been shown as a dotted line and a darker gray color, and a second electrode has been shown as a solid line and shaded with an oblique line in FIGS. 7A to 7C.

The electro-wetting display apparatus 200 of FIGS. 7A to 7C has the same configurations as those of the electro-wetting display apparatus 100 of FIGS. 1, 2, 5 and 6 except the structure of the openings. Accordingly, the structure of the openings will be mainly described in the electro-wetting display apparatus 200.

Referring to FIGS. 7A to 7C, a second electrode 223 of the electro-wetting display apparatus 200 includes a plurality of openings 224. As described above, the pixels PX are arranged in "n" rows by "m" columns. The openings 224 respectively correspond to pixel units. Each of the pixel units collectively includes two or more, but equal to or less than "m" pixels PX.

In one exemplary embodiment, for instance, as shown in FIG. 7A, the second electrode 223 may include the openings 224 respectively corresponding to the pixel units, each of which is configured to include two pixels PX arranged in each row. In addition, as shown in FIG. 7B, the second electrode 223 may include the openings 224 respectively corresponding to the pixel units, each of which is configured to include three pixels PX arranged in each row. As shown in FIG. 7C, the second electrode 223 may include the openings 224 respectively corresponding to the pixel units, each of which is configured to include "m" pixels PX arranged in each row. The structure shown in FIG. 7C may be defined as a long, narrow band or stripe structure. Although not shown in FIGS. 7A to 7C, the second electrode 223 may include the openings 224 respectively corresponding to the pixel units, each of which is configured to include four or more pixels PX arranged in each row.

However, the configuration of the openings 224 should not be limited thereto or thereby. In an alternative exemplary embodiment, for example, although not shown in FIGS. 7A to 7C, the second electrode 223 may include both the openings 224 respectively corresponding to the pixel units, each of which is configured to include two pixels PX arranged in each row, and the openings 224 respectively corresponding to the pixel units, each of which is configured to include three pixels PX arranged in each row. In addition, the second electrode 223 may include both the openings 224 respectively corresponding to the pixel units, each of which is configured to include two pixels PX arranged in each row, and the openings 224 respectively corresponding to the pixel units, each of which is configured to include (m–2) pixels PX arranged in each row. In this case, "m" is a constant number larger than four and each row of the second electrode 223 includes two openings 224.

Although not shown in FIGS. 7A to 7C, the openings 224 of the second electrode 223 may correspond to pixel units, each of which is configured to include two or more, but equal to or less than "m" pixels arranged in each row.

The openings 224 have the rectangular planar shape, but the openings 224 should not be limited to the rectangular shape.

As shown in FIGS. 7A to 7C, a width W1 of the pixel wall 214 disposed between two pixels PX adjacent to each other is smaller than a width W2 between two openings 224 adjacent to each other. Although not shown in FIGS. 7A to 7C, the width W1 of the pixel wall 214 disposed between two pixels PX adjacent to each other may be larger than the width W2 between two openings 224 adjacent to each other. In addition, the width W1 of the pixel wall 214 disposed between two pixels PX adjacent to each other may be the same as the width W2 between two openings 224 adjacent to each other.

As described with reference to FIG. 2, the area of the second electrode 123 including the openings 124 respectively corresponding to the pixel PX may be reduced by about 87.89% when compared with the area of the second electrode as the single body without the openings. However, the openings 224 of the second electrode 223 shown in FIGS. 7A to 7C respectively correspond to pixel units, each of which is configured to include two or more but equal to or less than "m" pixels arranged in each row. Thus, the area of the second electrode 223 including the openings 224 shown in FIGS. 7A to 7C may be reduced by more than 87.89% when compared with the area of the second electrode as the single body without the openings.

Consequently, since the exemplary embodiments of the second electrode 223 include the openings 224, the electro-wetting display apparatus 200 may improve the light transmittance different from that measured when the second electrode is the single body without the openings.

Figure 8A:
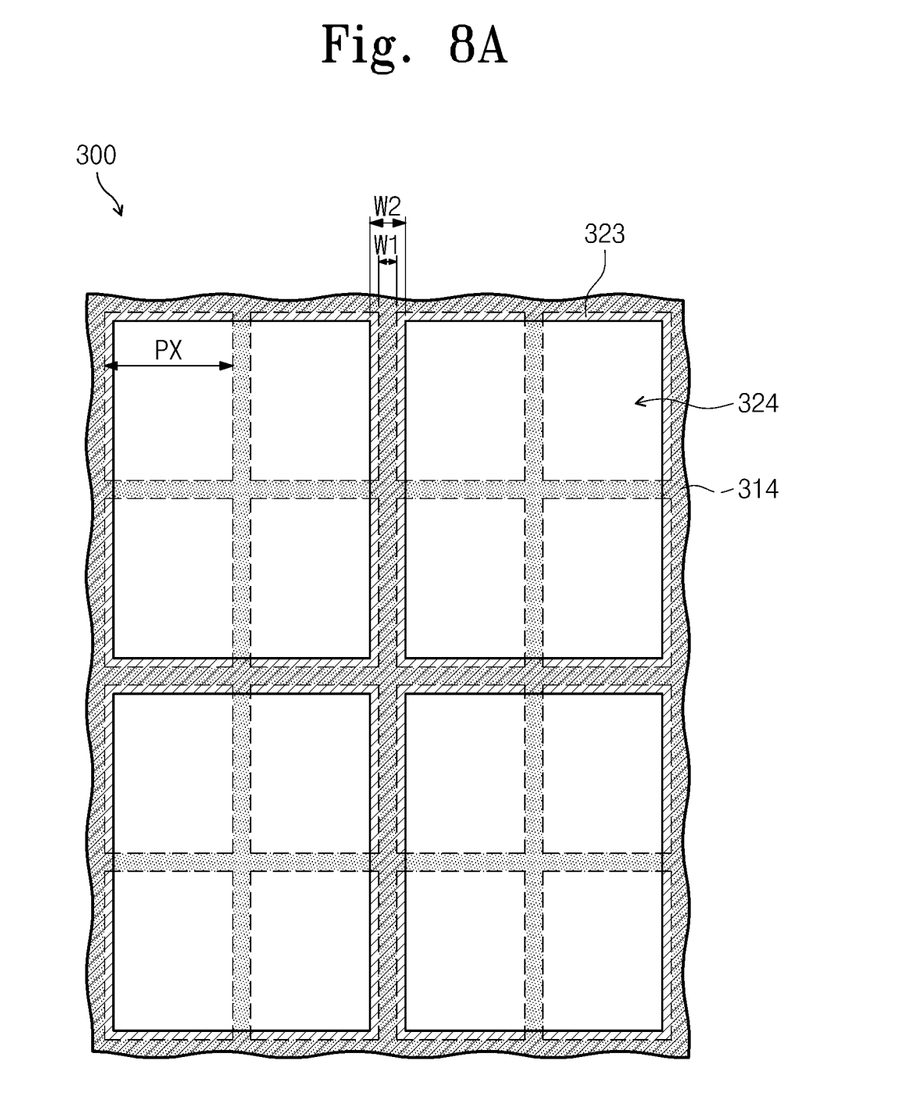
FIGS. 8A to 8C are plan views showing still other exemplary embodiments of plan structures of an electro-wetting display apparatus according to the invention.
Figure 8B:
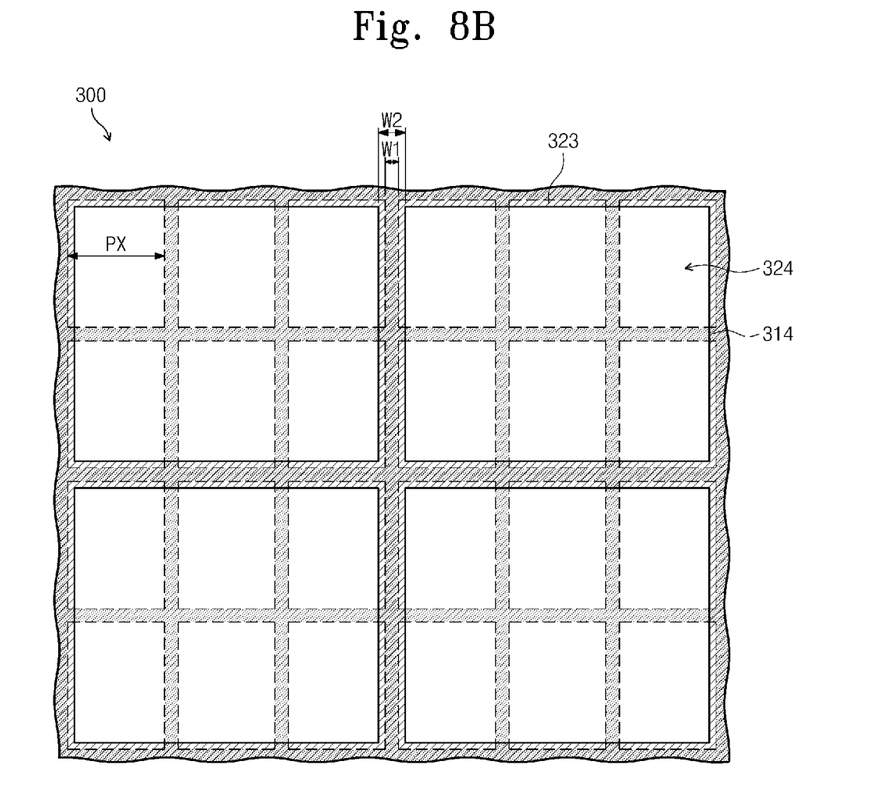
Figure 8C:
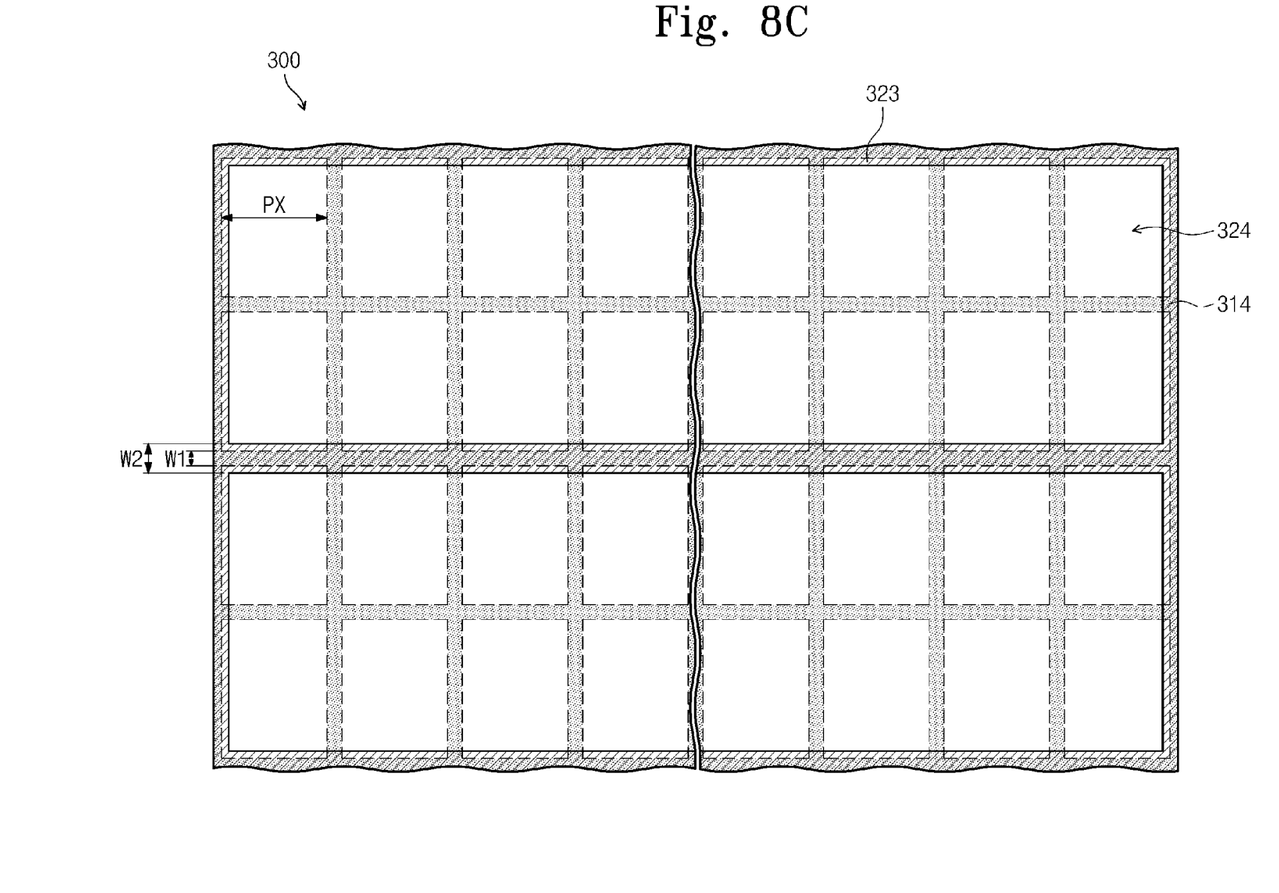

FIGS. 8A to 8C are plan views showing still other exemplary embodiments of a plan structure of an electro-wetting display apparatus according to the invention. For the convenience of explanation, a pixel wall has been shown as a dotted line and a darker gray color, and a second electrode has been shown as a solid line and shaded with an oblique line in FIGS. 8A to 8C.

The electro-wetting display apparatus 300 of FIGS. 8A to 8C has the same configurations as those of the electro-wetting display apparatus 100 of FIGS. 1, 2, 5 and 6 except the structure of the openings. Accordingly, the structure of the openings will be mainly described in the electro-wetting display apparatus 300.

Referring to FIGS. 8A to 8C, a second electrode 323 of the electro-wetting display apparatus 300 includes a plurality of openings 324. As described above, the pixels PX are arranged in "n" rows by "m" columns. The openings 224 respectively correspond to pixel units. Each of the pixel units collectively includes pixels PX arranged in two rows by two or more columns, but equal to or less than "m" columns In one exemplary embodiment, for instance, as shown in FIG. 8A, the second electrode 323 may include the openings 324 respectively corresponding to the pixel units, each of which is configured to include four pixels PX arranged in two rows by two columns. In addition, as shown in FIG. 8B, the second electrode 323 may include the openings 324 respectively corresponding to the pixel units, each of which is configured to include six pixels PX arranged in two rows by three columns. As shown in FIG. 8C, the second electrode 323 may include the openings 324 respectively corresponding to the pixel units, each of which is configured to include the pixels PX arranged in two rows by "m" columns. The structure shown in FIG. 8C may be defined as the stripe structure. Although not shown in FIGS. 8A to 8C, the second electrode 323 may include the openings 324 respectively corresponding to the pixel units, each of which is configured to include the pixels PX arranged in two rows by four or more columns.

However, the configuration of the openings 324 should not be limited thereto or thereby. In one exemplary embodiment, for example, although not shown in FIGS. 8A to 8C, the second electrode 323 may include both the openings 324 respectively corresponding to the pixel units, each of which is configured to include four pixels PX arranged in two rows by two columns, and the openings 324 respectively corresponding to the pixel units, each of which is configured to include six pixels PX arranged in two rows by three columns. In addition, the second electrode 323 may include both the openings 324 respectively corresponding to the pixel units, each of which is configured to include four pixels PX arranged in two rows by two columns, and the openings 324 respectively corresponding to the pixel units, each of which is configured to include the pixels PX arranged in two rows by (m–2) columns. In this case, "m" is a constant number larger than four and each row of the second electrode 323 includes two openings 324.

Although not shown in FIGS. 8A to 8C, the openings 324 of the second electrode 323 may correspond to pixel units, each of which is configured to include the pixels arranged in two columns, by two or more but equal to or less than "n" rows.

The openings 324 have the rectangular planar shape, but the openings 324 should not be limited to the rectangular shape.

As shown in FIGS. 8A to 8C, a width W1 of the pixel wall 314 disposed between two pixels PX adjacent to each other is smaller than a width W2 between two openings 324 adjacent to each other. Although not shown in FIGS. 8A to 8C, the width W1 of the pixel wall 314 disposed between two pixels PX adjacent to each other may be larger than the width W2 between two openings 324 adjacent to each other. In addition, the width W1 of the pixel wall 314 disposed between two pixels PX adjacent to each other may be the same as the width W2 between two openings 324 adjacent to each other.

As described with reference to FIG. 2, the area of the second electrode 123 including the openings 124 respectively corresponding to the pixel PX may be reduced by about 87.89% when compared with the area of the second electrode as the single body without the openings. However, the openings 324 of the second electrode 323 shown in FIGS. 8A to 8C respectively correspond to pixel units, each of which is configured to include pairs of pixels arranged in two rows by "k" columns. Thus, the area of the second electrode 323 including the openings 324 shown in FIGS. 8A to 8C may be reduced by more than 87.89% when compared with the area of the second electrode as the single body without the openings.

Consequently, since the exemplary embodiment of the second electrode 323 includes the openings 324, the electro-wetting display apparatus 300 may improve the light transmittance different from that measured when the second electrode is the single body without the openings.

Figure 9:
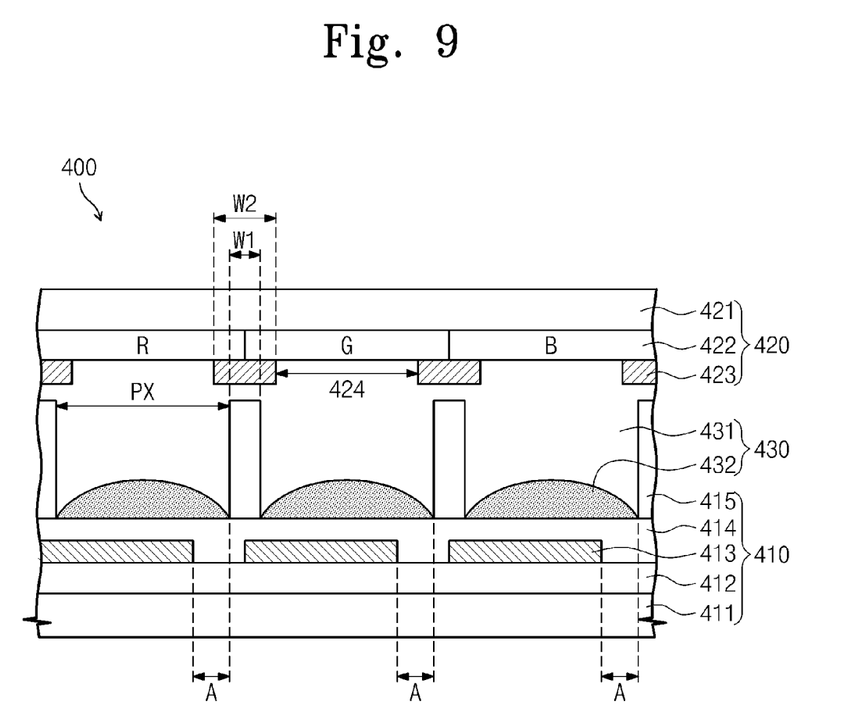
FIG. 9 is a cross-sectional view showing another exemplary embodiment of a cross-sectional structure of an electro-wetting display apparatus according to the invention.

FIG. 9 is a cross-sectional view showing another exemplary embodiment of a cross-sectional structure of an electro-wetting display apparatus according to the invention. The electro-wetting display apparatus 400 of FIG. 9 has the substantially same structure and function as that of the electro-wetting display apparatuses 100, 200, and 300 of previous exemplary embodiments except that the electro-wetting display apparatus 400 includes a reflective layer.

Referring to FIG. 9, the electro-wetting display apparatus 400 includes a first substrate 410, a second substrate 420 facing the first substrate 410, and a fluid 430 disposed between the first substrate 410 and the second substrate 420.

The first substrate 410 includes a first base substrate 411, a reflective layer 412 disposed on the first base substrate 411, a plurality of first electrodes 413 disposed on the reflective layer 412, an insulating layer 414 disposed on the reflective layer 412 to cover the first electrodes 413, and a pixel wall 415 disposed on the insulating layer 414 to define the pixels PX. The first electrodes 413 respectively correspond to the pixels PX.

The second substrate 420 includes a second base substrate 421 facing the first base substrate 411, color filters 422 disposed on the second base substrate 421, and a second electrode 423 disposed on the color filters 422 and including a plurality of openings 424. The reflective layer 412 reflects the light incident thereto. That is, the light passing through the second substrate 420 is reflected by the reflective layer 412 toward the second substrate 420.

The configuration and operation of the electro-wetting display apparatus 400 are the same as those of the electro-wetting display apparatuses 100, 200 and 300 according to the previous exemplary embodiments.

Consequently, since the second electrode 423 includes the openings 424, the exemplary embodiment of electro-wetting display apparatus 400 may improve the light transmittance different from that measured when the second electrode is the single body without the openings.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. An electro-wetting display apparatus comprising:
 a first substrate;
 a plurality of first electrodes disposed on the first substrate;
 a hydrophobic surface disposed on the plurality of first electrodes;
 pixel walls disposed on the hydrophobic surface, wherein the pixel walls intersect to partition a plurality of pixels, wherein the plurality of pixels respectively corresponds to the plurality of first electrodes such that each pixel includes a corresponding first electrode, and wherein each corresponding first electrode is spaced from at least one pixel wall to define a region within the pixel that includes the corresponding first electrode;
 a second substrate that faces the first substrate;
 a second electrode disposed on the second substrate; and
 a first fluid disposed on a second fluid, wherein the second fluid is disposed on the hydrophobic surface and is substantially immiscible with the first fluid, and wherein the first fluid and the second fluid are disposed in each of the pixels of the plurality of pixels between the first substrate and the second substrate,
 wherein displacement of the second fluid on the hydrophobic surface to the regions in the plurality of pixels, such that the first fluid replaces the second fluid on a portion of the hydrophobic surface, is controlled by voltages that are respectively applied to the plurality of first electrodes and the second electrode.

2. The electro-wetting display apparatus of claim 1, further comprising:
 an insulating layer disposed on the plurality of first electrodes,
 wherein the hydrophobic surface is disposed on the insulating layer.

3. The electro-wetting display apparatus of claim 1, further comprising:
 an insulating layer disposed on the plurality of first electrodes,
 wherein the hydrophobic surface comprises a hydrophobic layer disposed on the insulating layer.

4. The electro-wetting display apparatus of claim 1, wherein the second fluid comprises one of a red, green or blue color.

5. The electro-wetting display apparatus of claim 1, further comprising:
 color filters disposed on the second substrate,
 wherein the second electrode is disposed on the color filters, and
 wherein each color filter comprises a corresponding one of (i) a red color, (ii) a green color or (iii) a blue color.

6. The electro-wetting display apparatus of claim 1, wherein the plurality of first electrodes comprise a transparent conductive material.

7. The electro-wetting display apparatus of claim 6, wherein the plurality of first electrodes comprise one of (i) indium tin oxide, (ii) conductive polymer or (iii) carbon nanotube.

8. The electro-wetting display apparatus of claim 1, wherein the second electrode comprises a transparent conductive material.

9. The electro-wetting display apparatus of claim 8, wherein the second electrode comprises indium tin oxide.

10. The electro-wetting display apparatus of claim 1, wherein the second electrode is substantially aligned with portions of the pixel walls, wherein the second electrode includes a plurality of openings, and wherein each opening of the plurality of openings has a shape and size that substantially corresponds to a shape and size of one or more pixels of the plurality of pixels.

11. The electro-wetting display apparatus of claim 10, wherein the shape and size of each opening substantially corresponds to the shape and size of a single pixel.

12. The electro-wetting display apparatus of claim 11, wherein:
 each of the plurality of openings has a rectangular shape, and
 a width of the pixel wall between two adjacent pixels is smaller than a width of the second electrode between two adjacent openings.

13. The electro-wetting display apparatus of claim 11, wherein
 each of the plurality of openings has a rectangular shape, and
 a width of the pixel wall between two adjacent pixels is larger than a width of the second electrode between two adjacent openings.

14. The electro-wetting display apparatus of claim 11, wherein
 each of the plurality of openings has a rectangular shape, and a width of the pixel wall between two adjacent pixels is equal to a width of the second electrode between two adjacent openings.

15. The electro-wetting display apparatus of claim 1, wherein the first fluid is substantially transparent, and wherein the second fluid is substantially non-transparent.

16. The electro-wetting display apparatus of claim 1, wherein a height of the pixel walls is greater than a height of the second fluid when the second fluid is displaced to the regions of the pixels.

17. The electro-wetting display apparatus of claim 10, wherein each opening of the plurality of openings has a shape and a size that substantially corresponds to the shape and size, respectively, of two or more pixels of the plurality of pixels.

18. The electro-wetting display apparatus of claim 10, wherein each opening of the plurality of openings has a shape and a size that substantially corresponds to the shape and size of three or more pixels of the plurality of pixels.

19. The electro-wetting display apparatus of claim 10, wherein each opening of the plurality of openings has a shape and a size that substantially corresponds to the shape and size of four pixels of the plurality of pixels arranged in a two by two configuration.

20. The electro-wetting display apparatus of claim 10, wherein each opening of the plurality of openings has a shape and a size that substantially corresponds to the shape and size of six pixels of the plurality of pixels arranged in a two by three configuration.

21. The electro-wetting display apparatus of claim 1, further comprising a reflective layer that reflects light incident thereto, wherein the reflective layer is between the first substrate and the hydrophobic surface disposed on the plurality of first electrodes.

22. An electro-wetting display apparatus comprising:
a first substrate;
a plurality of first electrodes disposed on the first substrate;
a hydrophobic surface disposed on the plurality of first electrodes;
pixel walls disposed on the hydrophobic surface, wherein the pixel walls intersect to partition a plurality of pixels, wherein the plurality of pixels respectively corresponds to the plurality of first electrodes such that each pixel includes a corresponding first electrode, and wherein each corresponding first electrode is spaced from at least one pixel wall to define a region within the pixel that includes the corresponding first electrode;
a second substrate that faces the first substrate;
a second electrode on the second substrate, wherein the second electrode substantially aligns with the pixel wall and defines a plurality of openings, and wherein a corresponding portion of the second electrode extends into a corresponding opening such that each opening of the plurality of openings has a shape that is bent at a right angle in a substantially L shape over a corresponding pixel of the plurality of pixels;
a first fluid disposed on a second fluid, wherein the second fluid is disposed on the hydrophobic surface and is substantially immiscible with the first fluid, and wherein the first fluid and the second fluid are disposed in each of the pixels of the plurality of pixels between the first substrate and the second substrate,
wherein displacement of the second fluid on the hydrophobic surface to the regions in the plurality of pixels, such that the first fluid replaces the second fluid on a portion of the hydrophobic surface, is controlled by voltages that are respectively applied to the plurality of first electrodes and the second electrode.

23. The electro-wetting display apparatus of claim 22, further comprising:
an insulating layer disposed on the plurality of first electrodes,
wherein the hydrophobic surface is disposed on the insulating layer.

24. The electro-wetting display apparatus of claim 22, further comprising:
an insulating layer disposed on the plurality of first electrodes,
wherein the hydrophobic surface comprises a hydrophobic layer disposed on the insulating layer.

* * * * *